Sept. 14, 1926.　　　　　M. A. MAZADE　　　　　1,600,121

MERCURY STABILIZER FOR AEROPLANES, AIRSHIPS, AND OTHER AIRCRAFT

Filed Sept. 30, 1924　　　3 Sheets-Sheet 1

Inventor
M. A. Mazade
By Marks & Clerk

Sept. 14, 1926.  M. A. MAZADE  1,600,121
MERCURY STABILIZER FOR AEROPLANES, AIRSHIPS, AND OTHER AIRCRAFT
Filed Sept. 30, 1924   3 Sheets-Sheet 2
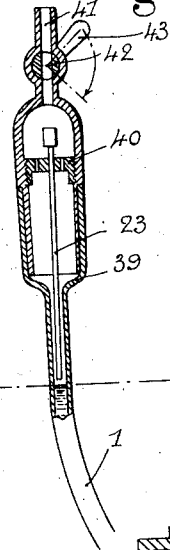
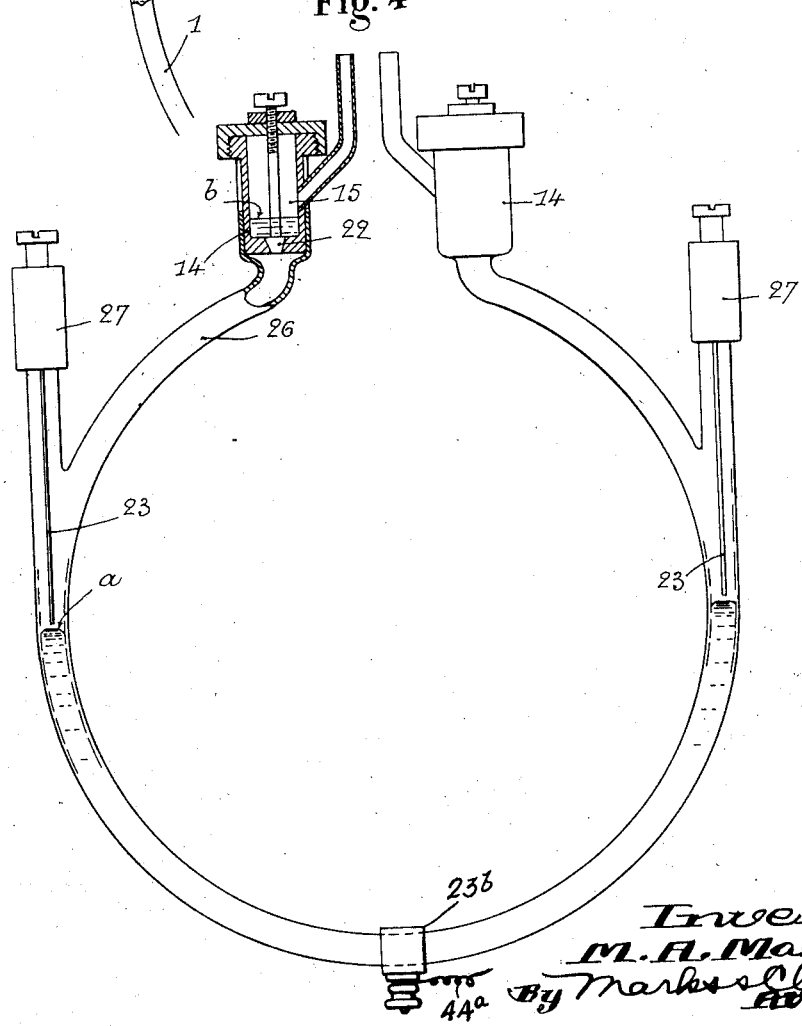

Sept. 14, 1926.

M. A. MAZADE 1,600,121

MERCURY STABILIZER FOR AEROPLANES, AIRSHIPS, AND OTHER AIRCRAFT

Filed Sept. 30, 1924    3 Sheets-Sheet 3

Inventor
M. A. Mazade
By Marks & Clerk
Attys.

Patented Sept. 14, 1926.

1,600,121

UNITED STATES PATENT OFFICE.

MAURICE ALEXANDRE MAZADE, OF PARIS, FRANCE.

MERCURY STABILIZER FOR AEROPLANES, AIRSHIPS, AND OTHER AIRCRAFT.

Application filed September 30, 1924, Serial No. 740,816, and in France October 11, 1923.

Mercury stabilizers are already in use, upon aeroplanes and airships, the function of such apparatus being to automatically control the horizontal motion of the aeroplane, airship or other aircraft in the air. For this purpose the mercury is contained in a receptacle, preferably a U tube, and the displacement of the level of the mercury in the said tube, in virtue of the variations in inclination of the aeroplane, or of effects of centrifugal force due to the acceleration or like causes, will provide for electric contacts required for the operation of relays, servo-motors or like devices on board which operate the control devices of the aeroplane and thus restore the equilibrium.

But in the known apparatus, the displacements of the mercury level are due not only to the above-mentioned causes, and in fact the sudden variations in speed as well as the jarring of the engine are found to occasion unduly rapid displacements of the mercury column and the splashing of drops of mercury, thus unduly and uselessly operating the controls of the aeroplane, which is prejudicial for the stability of the latter.

The present invention relates to an improved form of stabilizer which permits of regulating at will the movements of the mercury due to the accelerations, and which counteracts the movements of interference occasioned by the jarring of the engine or by shocks from any cause. The said apparatus is chiefly characterized in that it comprises restricted or throttled portions (nozzles or needle-valves) preferably of an adjustable cross section and which allow of adjusting the velocity of flow of the liquid, thus enabling the regulation of the oscillation period of the mercury column and to bring it into a suitable relation to the proper period of oscillation of the aircraft to be stabilized.

The device is mounted at either end of the mercury tube and the mercury is covered with a non-conducting liquid such as petroleum, and in this manner I obtain the braking of the oscillations of the liquid even when the mercury does not occupy the said restricted portions, the electric terminals being preferably mounted at the same level as the latter.

The appended drawings show by way of example various embodiments of the device according to the invention.

Fig. 4 is a modification in which the electric terminals are entirely separate from the device used for braking the mercury column.

Fig. 6 shows another arrangement in which the mercury is braked by the air or the fluid situated above the mercury in each branch of the U tube.

Figure 1:
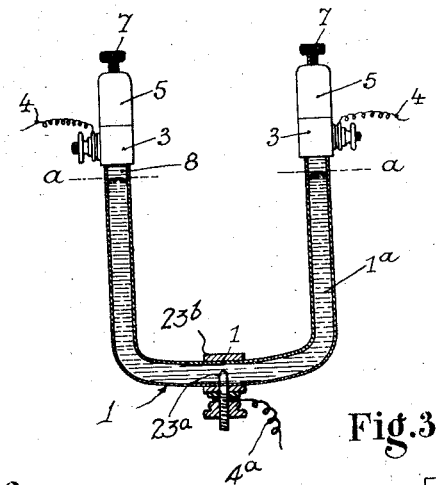
Fig. 1 is a front view of a stabilizer according to the invention, the portion of the apparatus containing the mercury being shown in section.

In the construction shown in the drawing, at each end of the U tube, made of an insulating substance such as glass, fibre or the like, which contains the mercury $1^a$ or other liquid conductor, is mounted a metallic element 2 provided with a duct 3 of small cross section which throttles the passage of the liquid and forms a nozzle. Each element 2 forms an electrode to which is connected a wire 4 leading to a servo-motor, relay, or like apparatus on board, which is capable of operating the controls of the aeroplane. The circuit is completed by an electrode $23^a$ passing through the lower part of the tube 1 and secured to a sleeve $23^b$ fastened to the tube 1 in a suitable manner. A wire $4^a$ leads to a third terminal of the servo-motor. The branches of the tube 1 are extended above the throttled portion 3 by means of a cap 5 provided with apertures 6 which are more or less closed by an adjustable needle valve 7, said apertures allowing atmospheric pressure to prevail above the liquid in the apparatus. In the normal position of the stabilizer, during the horizontal flight of the aeroplane, the level of the mercury in each branch of the tube 1 is at $a$—$a$, slightly below the lower part of the nozzles 2. Above the mercury, in each branch, is a certain quantity of insulating liquid 8, for example petroleum, which partly fills the said nozzles and thus ensures the braking of the motion of the liquid column even before the mercury enters the restricted portion 3.

It is evident that if the liquid tends to move suddenly in the tube in virtue of the effects of inertia and acceleration, or to the jarring of the engine, such motion will be braked very rapidly, since the liquid is obliged to flow through the conduits 3. The braking effect can be further increased by closing the upper part of the chamber 9 by means of the needle valve 7, for the air contained in the chamber 9 will now serve as an air cushion.

Should the aeroplane become inclined, the tube 1 secured therto will also take an inclined position, and the mercury will rise in one branch and descend in the other. The aeroplane assumes the inclined position in a progressive manner, so that the motion will suffer little or no delay from the effect of the throttled portions 3. At a given moment, the mercury will enter into contact with the lower part of one of the elements 2, thus closing the circuit, and the apparatus which are suitably branched upon the corresponding line 4, 4* will now operate the controls in the proper direction for restoring the equilibrium of the aeroplane.

It will be noted that the shape of the lower part of the element 2 as shown in the drawing will prevent any particles of mercury from remaining by capillarity against the said element when the inclination becomes normal, and in particular, it is observed that the annular space 10 will in all cases contain nothing but petroleum.

Obviously, instead of admitting the atmospheric pressure through the apertures 6, the latter may be connected by suitable conduits to a Venturi tube suitably disposed, so that the vacuum thus formed will prevail above the liquid. The sudden effects produced upon the mercury column by the variations in the vacuum will also be braked by the device. One may determine by experiment the most suitable diameter of the apertures 3, in order to provide the adequate braking of the motion of the liquid column of the apparatus mounted upon a given type of aeroplane.

Figure 3:
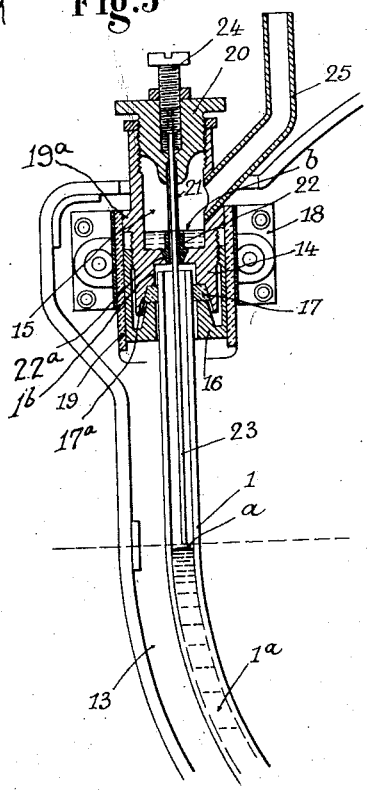
Fig. 3 shows a practical construction of the device shown in Figs. 1 and 2, only one branch of the mercury tube being represented.

In Fig. 3, the tube 1 is mounted in a known manner upon a movable disc 13. Upon the end of the tube is disposed a socket 14 formed with an inner chamber 15, opening into the atmosphere at its upper part. The bottom of said chamber 15 is provided with a conical seat 22* adapted to cooperate with a needle valve 22. Below the bottom of the chamber 15 is a cylindrical recess 1ᵇ for receiving the end of the tube 1 and a conical recess 17ᵃ. The socket 14 is provided with an inner screw thread at its upper part and an outer screw thread at the lower part, below the collar 19ᵃ formed at the outer periphery of said socket A cap 16, is screwed upon the lower part of said socket and an elastic packing 17 interposed between the said cap and the socket whereby a fluidtight joint is obtained by screwing on said cap on said socket. The socket 14 is secured to the disc 13 through the medium of the insulating support 18 provided with the insulating sleeve 19 bearing upon the collar 19ᵃ and the outer periphery of the cap 16.

Into the top of the socket 14 is screwed a nut 20 having secured thereto a tube 21 whose lower end forms a needle 22; the latter can be moved towards or from the corresponding seat which is formed by the aperture pierced in the end of the socket 14. The electrode 23 extends through the nut 20 and tube 21 and its end is adjacent the surface $a$ of the mercury, its position being adjusted by means of the screw 24 secured to said conductor and co-operating with the nut 20.

A tube 25 opens into the chamber 15 of the said socket 14 and may be connected with a suitable device producing a pressure or a vacuum, for example a Venturi or a Pitot tube, so that the chamber 15 may be subjected to a pressure equal to, above or below atmospheric pressure, or to pressure variations correcting the movement of the mercury column.

Figure 2:
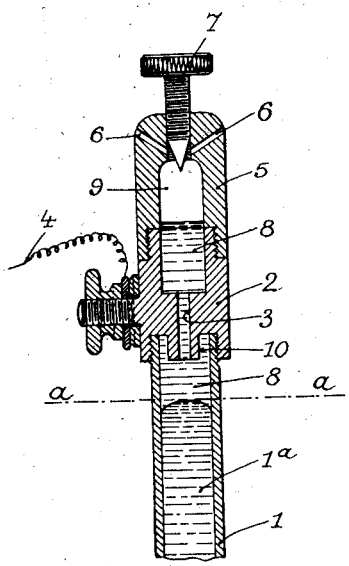
Fig. 2 is a section on a larger scale showing the arrangement of each end of the mercury tube.

As set forth for the device shown in Figs. 1 and 2, I place above the mercury an insulating liquid such as petroleum, which reaches for instance the level $b$ so that the needle valve 22 will be entirely submerged.

The operation is the same as described for the device shown in Figs. 1 and 2; the differences of level, or the oscillations of the mercury, to whatever extent, and consequently, the oscillations of the covering liquid, being suitably damped, since the insulating liquid must flow through the adjustable aperture which is more or less closed by the needle-valve 22. The velocity of the motion of the mercury column will depend upon the output of the said aperture.

Fig. 4 shows a modification of Fig. 3 in which the member 27 provided with the electric conductor 23 is separate from the socket or chamber 14 containing the needle valve 22, the socket being mounted upon a glass tube 26 forming an extension of the mercury tube 1. Obviously, the insulating liquid covering the surface $a$ of the mercury should reach approximately the level $b$ in the chamber 15 in the socket 14 in order that the needle-valve shall be submerged.

In Figs. 3 and 4 the needle-valves are shown in the closed position, but it is obvious that the valves must be more or less opened according to the degree of braking to be obtained.

Figure 5:
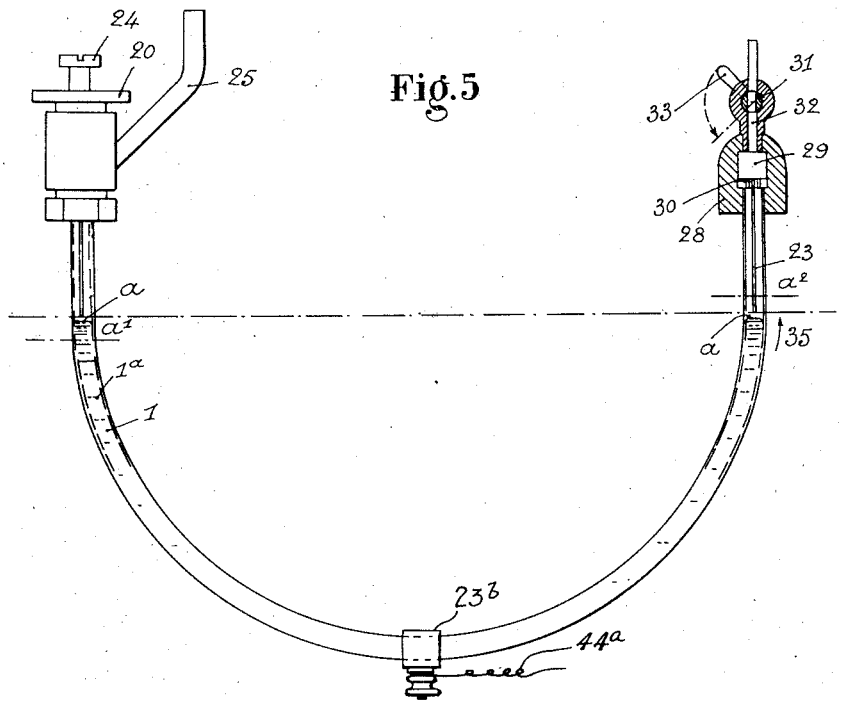
Fig. 5 shows another modification.

Fig. 5 shows a modified form of the device, wherein one branch of the tube 1 (to the left in the figure) is provided with the device as shown in Fig. 3, whilst the other, or right-hand branch, has mounted thereon in a fluidtight manner a hollow element 28 carrying the corresponding electrode 23; the interior of the tube 1 communicates with the chamber 29 by means of the apertures 30 pierced in the member supporting the said electrode. Upon the element 28 is mounted a cock 31 adapted to close the conduit 32 and operated by the handle 33; said cock may be replaced by a needle-valve or by like closing means. Various arrangements of a similar nature may be employed to produce the same result.

The operation is as follows. The glass tube 1 which contains the mercury as far as the level $a$ is placed in the horizontal position; one opens the cock 31, and the conduit 32 is connected with a device serving to produce a vacuum, such as a suction apparatus, a pump, a Venturi tube, or the like, thus creating a vacuum in the chamber 29 which displaces the mercury in the direction of the arrow 35. One thus obtains, for the horizontal position, a mercury column whereof the level is situated at $a^1$ and $a^2$; the weight of the portion of said column between $a^2$ and $a$ is balanced by the action of the vacuum, but said portion is still subjected to the effects of acceleration and of centrifugal force.

In practice the electrodes may be displaced by any known adjusting means whereby they are so adjusted that their ends are at equal distances from both levels of the mercury column, or if the mercury tube is mounted upon a positive control disc, this latter is suitably angularly displaced. This arrangement will afford a vertical clino-accelerometer which will provide for a very sensitive registering of the downward accelerations.

If the whole device is accelerated downwardly, the portion $a^2$—$a$ of the mercury will rise by inertia in the right hand part of the tube 1 and will enter into contact with the conductor 23 secured to the element 28. But if on the contrary the said device is given an upward acceleration, the effect of the inertia of the portion $a^2$—$a$ will be counteracted by the vacuum prevailing in the chamber 29 so that the stabilizer will be more responsive to upward than to downward accelerations of aircraft.

But if instead of producing a vacuum in the chamber 29, the conduit 32 is connected with a device producing a pressure, the contrary result will be obtained, and the stabilizer will be more responsive to downward than to upward accelerations.

The said arrangement may also be operated at atmospheric pressure by opening the cock 31, and in this event the stabilizer is equally responsive to upward and downward accelerations.

As shown in Fig. 6, each branch of the mercury tube 1 has mounted thereon a hollow element 39, analogous to the element 28. The electric conductors 23 are respectively carried by perforated members 40; each element 39 has formed therein a conduit 41 upon which is disposed a cock 42 controlled by the handle 43. No insulating liquid is disposed above the mercury in this case, and the damping of the oscillations of the mercury in the tube 1 is obtained by adjusting the closing position of the cocks 42 which offer more or less resistance to the flow of the air or gaseous fluid situated above the mercury in each branch of the tube. The rate of movement of the mercury under the effect of the oscillations or shocks will depend upon the flow section of the said cocks and the compressibility of the fluid.

It should be noted that by means of the conduits 41 one may produce (as in Fig. 5) either a pressure or a vacuum above the mercury in one or both branches of the tube 1.

Figure 7:
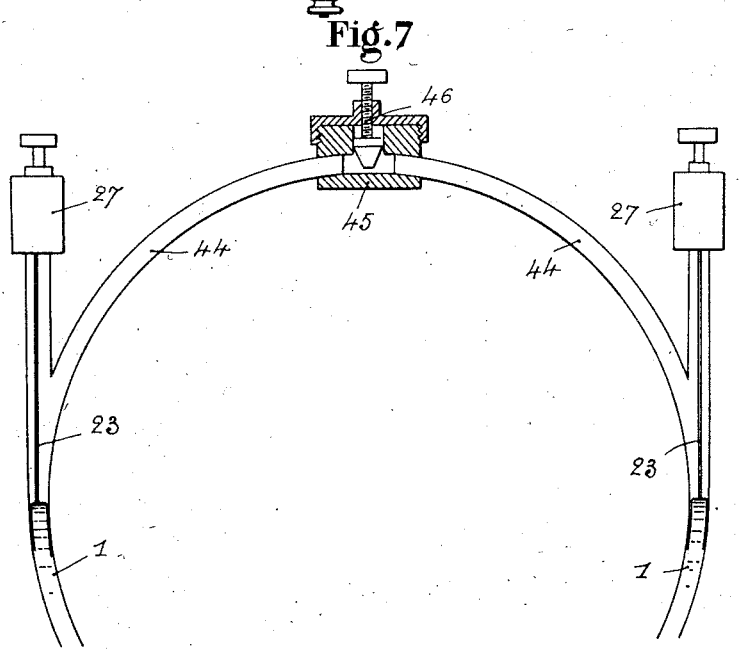
Fig. 7 shows another arrangement in which the mercury is braked in both branches by the same means.

In Fig. 7 the damping of the mercury is effected in either direction by a single arrangement, and herein the two branches of the mercury tube 1 comprise extensions 44 which are connected by a sleeve 45 provided with a screw needle 46 more or less closing the passage between the said extensions. Above the mercury is disposed an insulating liquid such as petroleum which entirely fills the apparatus, so that irrespectively of the direction of motion of the mercury, the motion willl be damped by the needle-valve 46 which will counteract the flow of the insulating liquid in either direction. The degree of damping obtained with the said needle-valve will depend upon the position of the same within the sleeve 45.

It is obvious that various constructional modifications may be brought to the above described apparatus without departing from the scope of the invention; in particular, the mercury receptacle may be given another shape than that of a U tube, provided the mercury is enabled to move therein and to produce the same effects as in the apparatus above described. The said apparatus adapted for vertical steering, may obviously be used upon aeroplanes, airships and like aircraft, and can be applied with equal facility to stabilizers and to other apparatus on board.

Having now described my invention, what I claim as new and desire to secure by Letters Patent is:

1. In a stabilizer for the control of the motion of an air craft the combination of a curved tube containing a conducting liquid and a nonconducting liquid above and covering said conducting liquid, conducting contact pieces carried by said tube above the normal level of said conducting liquid in each branch of said tube and throttled parts provided on said tube above said normal level and adapted to damp the motion of the non-conducting liquid through the tube, whereby the oscillation period of the column of conducting liquid may be regulated.

2. In a stabilizer for the control of the motion of an aircraft the combination of a curved tube containing a conducting liquid and a nonconducting liquid above and covering said conducting liquid, conducting contact pieces carried by said tube above the normal level of said conducting liquid in each branch of said tube, and throttled parts of adjustable cross section provided on said tube above said normal level and adapted to damp the motion of the nonconducting liquid through the tube, whereby the oscillation period of the column of conducting liquid may be regulated.

3. In a stabilizer for the control of the motion of an aircraft the combination of a curved tube containing a conducting liquid and a non-conducting liquid above and covering said conducting liquid, conducting contact pieces carried by said tube above the normal level of the liquid in each branch of said tube, throttled parts of adjustable cross section provided on said tube above said normal level and adapted to damp the motion of the non-conducting liquid through the tube and chambers into which said throttled parts are respectively opening and in communication with the exterior.

4. In a stabilizer for the control of the motion of an aircraft the combination of a curved tube containing a conducting liquid and a nonconducting liquid above and covering said conducting liquid, conducting contact pieces carried by said tube above the normal level of the liquid in each branch of said tube, throttled parts of adjustable cross section, provided on said tube above said normal level and adapted to damp the motion of the non-conducting liquid through the tube, chambers into which said throttled parts are respectively opening, means for producing within said chambers a pressure different from the atmospheric pressure and ducts of adjustable cross section connecting said chambers with said means.

5. In a stabilizer for the control of the motion of an aircraft the combination of a curved tube containing a conducting liquid and a nonconducting liquid above and covering said conducting liquid, conducting contact pieces carried by said tube above the normal level of the liquid in each branch of said tube, plugs mounted at either ends of said tube, chambers within said plugs, ducts of restricted cross section connecting said chambers with the interior of the tube and opening above said normal level whereby the oscillation period of the liquid column may be regulated and ducts of adjustable cross section connecting said chambers with the exterior.

6. In a stabilizer for the control of the motion of an aircraft the combination of a curved tube containing a conducting liquid and a nonconducting liquid above and covering said conducting liquid in each branch of said tube, conducting contact pieces carried by said tube above the normal level of said conducting liquid, plugs mounted at either ends of said tube, each plug having an extension protruding within the tube, said extension having its lower end above said normal level of the conducting liquid and leaving between its wall and the tube an annular space constantly filled with nonconducting fluid, chambers within said plugs, ducts of restricted cross section provided through said extensions of the plugs, and connecting said chambers with the interior of the tube, whereby the oscillation period of the column of conducting liquid may be regulated.

7. In a stabilizer for the control of the motion of an aircraft the combination of a curved tube containing a conducting liquid and a non-conducting liquid above and covering said conducting liquid, plugs of conducting material mounted at either ends of said tube and constituting terminals for the electric circuit of the stabilizer, chambers within said plugs, ducts of restricted cross-section connecting said chambers with the interior of the tube and adapted to damp the motion of the non-conducting liquid, and opening above said normal level whereby the oscillation period of the liquid column may be regulated and ducts of adjustable cross section connecting said chambers with the exterior.

8. In a stabilizer for the control of the motion of an aircraft the combination of a curved tube containing a conducting liquid and a non-conducting liquid above and covering said conducting liquid, conducting contact pieces carried by said tube above the normal level of the liquid in each branch of said tube, plugs mounted at either ends of said tube, chambers within said plugs, ducts of restricted cross section and forming a valve seat above said normal level for connecting said chambers with the interior of the tube, an adjustable valve cooperating with said valve seat, whereby the oscillation period of the liquid column may be regulated and ducts of adjustable cross section connecting said chambers with the exterior.

9. In a stabilizer for the control of the motion of an aircraft the combination of a curved tube containing a conducting liquid and a non-conducting liquid above and covering said conducting liquid, conducting contact pieces carried by said tube above the normal level of the liquid in each branch of said tube, extensions of said tube opening above said normal level, plugs mounted respectively on said extensions, chambers within said plugs and in communication with the exterior and ducts of restricted cross section connecting said chambers with the exterior of said extensions and of the tube, whereby the oscillation period of the liquid column may be regulated.

10. In a stabilizer for the control of the motion of an aircraft the combination of a curved tube containing a conducting liquid and a non-conducting liquid above and covering said conducting liquid, conducting contact pieces carried by said tube above the normal level of the liquid in each branch of said tube, throttled parts of adjustable cross section provided at either ends of said tube above said normal level and chambers into which said throttled parts are respectively opening, the pressure within the chamber at one end of the tube being different from that in the chamber at the other end, whereby the oscillation period of the liquid column may be regulated and the responsitivity of the stabilizer varied at will.

In testimony whereof I have signed my name to this specification.

MAURICE ALEXANDRE MAZADE.